United States Patent [19]

Ishimaru et al.

[11] Patent Number: 5,154,223
[45] Date of Patent: Oct. 13, 1992

[54] AUTOMOTIVE AIR-CONDITIONER HAVING A FILM DAMPER

[75] Inventors: Masahiro Ishimaru, Nagoya; Michihiko Kamiya, Handa; Akihito Higashihara, Chiryu, all of Japan

[73] Assignee: Nippondenso Co., Ltd., Kariya, Japan

[21] Appl. No.: 672,642

[22] Filed: Mar. 21, 1991

[30] Foreign Application Priority Data

Mar. 22, 1990 [JP] Japan ................................. 2-72948

[51] Int. Cl.$^5$ ............................................ F28F 27/02
[52] U.S. Cl. ...................................... 165/42; 165/96; 165/103; 137/872; 251/901
[58] Field of Search ................. 165/42, 43, 96, 103; 137/862, 872, 601; 251/901

[56] References Cited

U.S. PATENT DOCUMENTS

| 4,084,616 | 4/1978 | Tragert | 251/901 |
| 4,216,822 | 8/1980 | Izumi | 165/42 |
| 5,014,911 | 5/1991 | Vincent | 165/42 |

FOREIGN PATENT DOCUMENTS

| 1476716 | of 0000 | France | 165/101 |
| 61-98609 | 6/1986 | Japan | |
| 62-009 | 1/1988 | Japan | |
| 63-166618 | 7/1988 | Japan | |
| 61-010 | 9/1988 | Japan | |
| 62-019 | 11/1988 | Japan | |
| 64-036515 | 2/1989 | Japan | |
| 476412 | 11/1975 | U.S.S.R. | 165/103 |

*Primary Examiner*—John Rivell
*Assistant Examiner*—L. R. Leo
*Attorney, Agent, or Firm*—Cushman, Darby & Cushman

[57] ABSTRACT

An automotive air-conditioner has a heater core and a flexible film damper in a duct. A bypass passage is defined between the heater core and an inner wall of the duct. A heated air passage is defined downstream of the heater core. An air outlet for discharging air from the duct into a passenger compartment is disposed downstream of the duct. A flexible film damper having at least one damper opening therein is arranged to open and close the heated air passage, the bypass passage and the air outlet. The flexible film damper is driven by an driving mechanism to change the position of the damper opening so that the size of the air outlet is adjusted in response to the selected ratio of the cross-sectional areas between the heated air passage and the bypass passage.

9 Claims, 6 Drawing Sheets

PRIOR ART

AUTOMOTIVE AIR-CONDITIONER HAVING A FILM DAMPER

This application claims the priority of Japanese patent application No. 2-72948 filed on Mar. 22, 1990, which is incorporated herein by reference.

BACKGROUND OF THE INVENTION

1. Field of the Invention

The present invention relates to an automotive air-conditioner having a film damper for both controlling the temperature of conditioned air and opening and closing an outlet.

2. Description of the Related Art

The prior art automotive air-conditioner uses a film damper for opening and closing an outlet. For example in Japanese patent laid-open publication No. 63-166618, film dampers are adopted not only for opening and closing an outlet but also for controlling the temperature of air flowing into a passenger compartment respectively. This is accomplished by adjusting the air-mixing ratio of air passing through the heater core and air passing through a bypass passage that bypasses the heater core. That is to say, the above prior art automotive air-conditioner has a pair of film dampers for (1) controlling the temperature of the air and for (2) opening and closing an outlet. Such film dampers inevitably need space for working. Therefore it is difficult to save space. Further, the increases in number of parts by the use of two film dampers for one outlet increase production costs. As shown in FIG. 9, another prior art automotive air-conditioner has one rotary damper for controlling the air-mixing ratio of heated air and cooled air and for opening and closing an outlet.

The air-conditioner shown in FIG. 9 comprises a refrigerant evaporator 100 and a heater core 101 in a casing 102. The heater core 101 is positioned downstream of the evaporator 100. The air from the fan (not shown) all flows through the evaporator 100. However, the heater core 101 is so disposed in the casing 102 that a bypass passage 103 is defined between the heater core 101 and an inner wall of the casing 102. The bypass air outlet 110 is disposed downstream of the bypass passage 103 through which air from the evaporator 100 flows into an air-mixing chamber 107. A heated air outlet 109 is disposed downstream of the heater core 101. Heated air flows through the heated air outlet 109 into the air-mixing chamber 107. An air outlet 105 is disposed downstream of the air-mixing chamber 107. Air mixed in the air-mixing chamber 107 flows into the passenger compartment through the air outlet 105. The rotary damper has an arc portion 106 of which size fits the largest of the three outlets. A rotary damper 104 is pivotally disposed in the air-mixing chamber 107 for selectively directing the arc portion 106 to one of the outlets 105, 109 and 110. Thus, the rotary damper 104 can adjust the air-mixing ratio of heated air and air passing through the bypass passage 103. The radius of gyration of the rotary damper 104 depends on the size of the arc portion 106 so that if the larger outlet is required, the size of the rotary damper 104 effectively increases. Therefore, an outlet having a larger cross-sectional area requires a correspondingly large rotary damper. This requires a relatively large volume of casing 102. Therefore, it is difficult to install the casing 102 in a limited space in an automobile.

SUMMARY OF THE INVENTION

An object of the present invention is to provide space saving automotive air-conditioner which reduces production costs by reducing the number of parts. The automotive air-conditioner according to the present invention has a flexible film damper having at least one damper opening through which air passes. The position of the damper opening of the film damper is advanced by a driving means. A heated air passage through which air passing through the heater core flows and a bypass passage through which air bypassing the heater core flows are selectively opened by the damper opening by advancing and withdrawing the film damper. The ratio of cross-sectional area of the air outlet through which the air flows into the passenger compartment is adjusted by the ratio of cross-sectional area of the heated air passage and the bypass passage. Accordingly, the position of the damper opening of the film damper is shifted by shifting the film damper so that the film damper selectively opens and closes the heated air passage and the bypass passage, and selectively opens and closes an outlet.

BRIEF DESCRIPTION OF THE DRAWINGS

The features of the present invention that are believed to be novel are set forth with particularity in the appended claims. The invention, objects and advantages thereof, may best be understood by reference to the following description of the presently preferred embodiments together with the accompanying drawings in which:

DETAILED DESCRIPTION OF THE PREFERRED EMBODIMENTS

Figure 1:
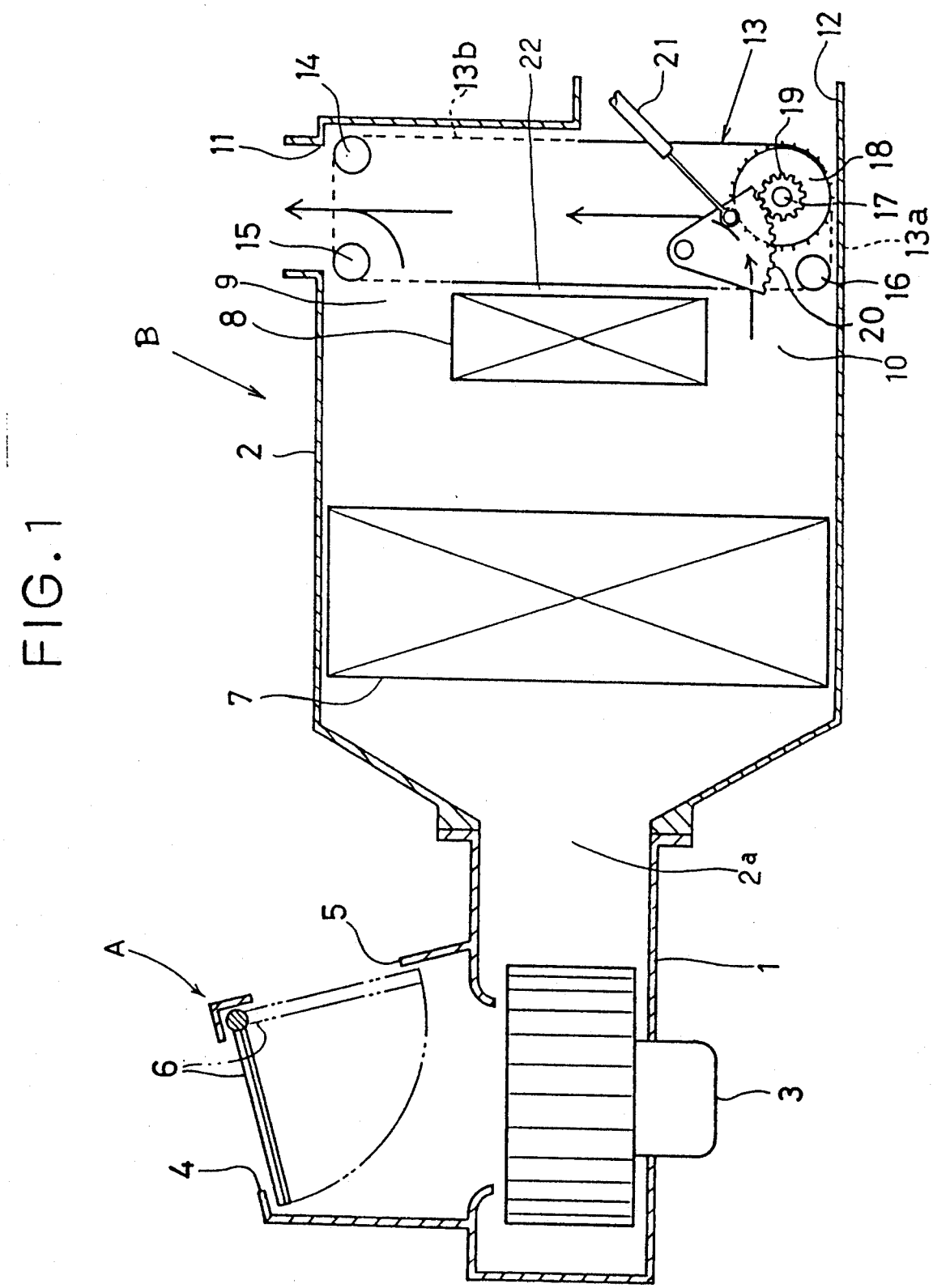
FIG. 1 is a schematic illustration of a first embodiment in "Max Cooling Mode" of an automotive air-conditioner according to the present invention.

Referring to FIG. 1 of the drawing, an air-mixing type automotive air-conditioner is provided in which an automotive air-conditioner mixes heated air and cooled air for delivery to a passenger compartment. The automotive air-conditioner has a fan section generally designated by A and an air-conditioning section generally designated by B.

The fan section A includes a fan casing, a centrifugal fan 3, a re-circulated air inlet 4 and a fresh air inlet 5. The fan casing 1 accommodates the centrifugal fan 3. The fan casing 1 is connected to a duct 2 through an air inlet 2a. The re-circulated air inlet 4 for re-circulating air in the passenger compartment and the fresh air inlet 5 for introducing outside air are disposed upstream of the fan 3. A change-over damper 6 is pivotally mounted on the fan casing 1. The air inlets 4 and 5 can be selectively opened and closed by the change-over damper 6 so that either fresh air or re-circulated air can be sucked in by the fan 3 into the duct 2.

The air-conditioning section B includes an air-cooling heat exchanger, an air-heating heat exchanger, the duct 2, a film damper and air outlets. An air-cooling heat exchanger formed by a refrigerant evaporator 7 is disposed in the duct 2 downstream of the fan 3. An air-heating heat exchanger formed by a heater core 8 is disposed in the duct 2 downstream of the evaporator 7. The heater core is heated by engine coolant. The heater core 8 is disposed in the center of the duct 2 such that a first bypass passage 9 and a second bypass passage 10 are defined between the heater core 8 and the inner wall of the duct 2. A heated air passage 22 is disposed downstream of the heater core 8. The cross-sectional area of the heated air passage 22 is varied in response to the cross-sectional opening area of the heater core 8 in which heated air can flow downstream without being blocked by the film damper 13. A first air outlet 11 opening into a ventilation air outlet (not shown) in the passenger compartment and a second air outlet 12 opening into a defrosting air outlet (not shown) and a heating air outlet (not shown) in the passenger compartment are disposed downstream of the duct 2.

Figure 2:
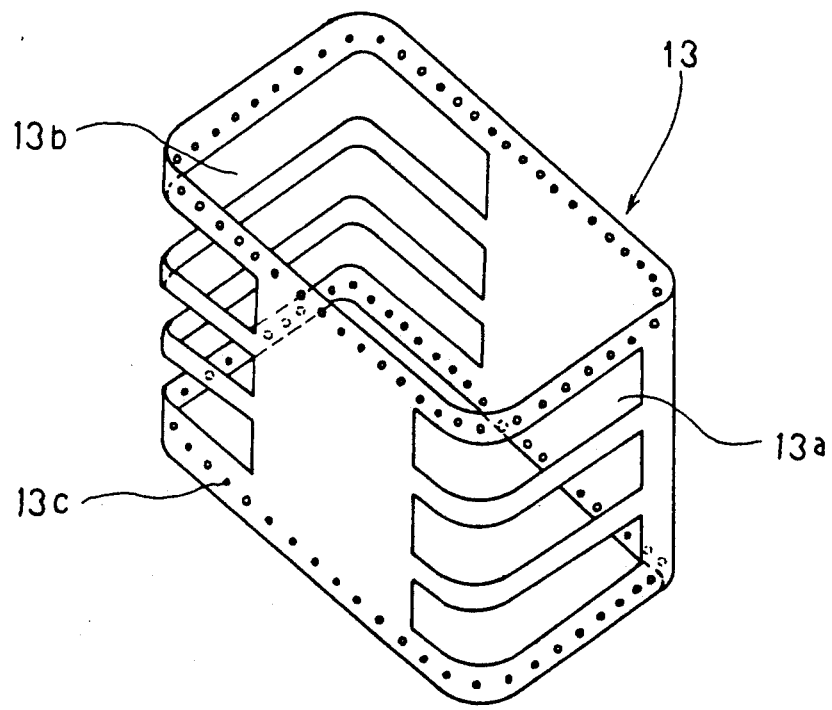
FIG. 2 is a perspective view of a film damper incorporated in the automotive air-conditioner shown in FIG. 1.

A film damper 13 is disposed downstream of the heater core 8 and downstream of the duct 2. The film damper 13 is formed from an endless flexible film belt, as shown in FIG. 2, that may be made of polyethylene resin. The film damper 13 may be made endless by connecting (e.g. bonding or welding) both ends of the film damper 13. The film damper 13 has first and second damper openings 13a and 13b and engaging holes 13c. The first and second damper openings 13a and 13b are formed from plural slits each. Opposing edges of the film damper 13 have a plurality of engaging holes 13c. The first and second damper openings 13a and 13b are shown as dashed lines in FIGS. 1, 3, and 4. The engaging holes 13c are engaged with a driving gear 18 which is included in driving means.

The driving means is formed from a supporting frame (not shown), rollers 14, 15 and 16, a driving shaft 17, driving gears 18, a pinion 19, a driving plate 20, and a wire 21. The supporting frame is formed from a pair of frame members. Each of the frame members is formed along the opposing edges of the film damper 13. The rollers 14, 15 and 16 and the driving shaft 17 are rotatably supported at their both ends by the respective corners of the pair of frame members so as to form a rectangular shape cross-sectionally. The driving gears 18 are fixed at the both ends of the driving shaft 17. The driving gears 18 are engaged with the engaging holes 13c. The pinion 19 is fixed at one end of the driving shaft 17 to be positioned outside of the wall of the duct 2. The driving plate 20 in the shape of a fan is movably disposed at the outer wall of the duct 2. One end of the wire 21 is connected to the driving plate 20 and the other end is connected to a temperature control lever (not shown). The temperature control lever is disposed at a control panel of an automotive air-conditioner in the passenger compartment.

Therefore, when the temperature control lever is moved by the passenger, the driving plate 20 is remotely operated through the wire 21 and the driving shaft 17 is rotated by the driving plate 20 through the pinion 19 so that the film damper 13 is moved along the frame members through the driving gears 18.

The temperature control lever is used to change the air-conditioning modes which are indicated by "Max Cooling Mode", "Bi-Level Mode" and "Max Heat Mode". The first and second damper opening 13a and 13b selectively open and close the first and second bypass passages 9 and 10 and the heated air passage 22. These movements, in turn selectively open and close the first air outlet 11 and the second air outlet 12.

The film damper 13 adjusts the ratio of total cross-sectional opening area of the first and second bypass passages 9 and 10 versus cross-sectional area of the heated air passage 22. This is accomplished by changing the position of the first and second damper openings 13a and 13b in response to the movement of the film damper 13. As a result, the temperature of air flowing into the passenger compartment is controlled.

Next, the operation of the described embodiment of the invention in each of the operational mode will be described hereunder. A fan switch (not shown) is actuated to start the fan 3. The fan 3 sucks air from the re-circulated air inlet 4 or the fresh air inlet 5 and discharges this air into the duct 2. The air discharged into the duct 2 is cooled by heat exchanging with a refrigerant at low temperature which flows in the evaporator 7, when a cooler switch (not shown) is turned on.

(a) when the temperature control lever is set in "Max Cooling Mode".

The driving plate 20 is moved by the wire 21 so that the film damper 13 moves to the position shown in FIG. 1. That is, the heated air passage 22 is blocked by the film damper 13, and the first and second bypass passages 9 and 10 are opened by the first and second damper openings 13a and 13b. Further, the second damper opening 13b is set in the position to open the first air outlet 11. The second air outlet 12 is blocked by the film damper 13. As a result, the air cooled by passing through the evaporator 7 passes through the first and second bypass passages 9 and 10 and is discharged through the first air outlet 11. And then, it flows into the passenger compartment through the ventilation air outlet.

(b) When the temperature control lever is set in "Bi-Level Mode"

Figure 3:
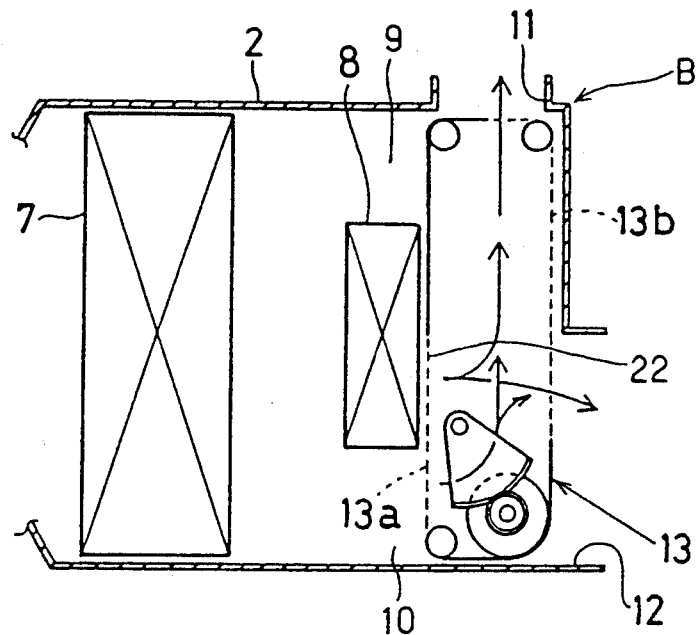
FIG. 3 is a schematic illustration of an air-conditioning section showing a first embodiment in "Bi-Level Mode" according to the present invention.

In response to the predetermined temperature in the passenger compartment, the film damper 13 adjusts the ratio of cross-sectional area of the first and second bypass passages 9 and 10 versus of cross-sectional area of the heated air passage 22. For example, as shown in FIG. 3, the heated air passage 22 is partly opened by the first damper opening 13a. The second bypass passage 10 is fully opened by the first damper opening 13a. The first bypass passage 9 is fully blocked by the film damper 13. The first and second air outlets 11 and 12 are partly opened by the second damper opening 13b. The ratio of cross-sectional area of the first air outlet 11 versus the second air outlet 12 is adjusted in response to the positioning of the first damper opening 13a with respect to the heated air passage 22. As a result, a part of air cooled by the evaporator 7 is heated by the heater core 8. This reheated air is mixed with the bypass air passing through the bypass passage 10 so that a mixture of heated air and cooled air passes into the passenger compartment through the first and second air outlets 11 and 12.

(c) When the temperature control lever is set in "Max Heat Mode"

Figure 4:
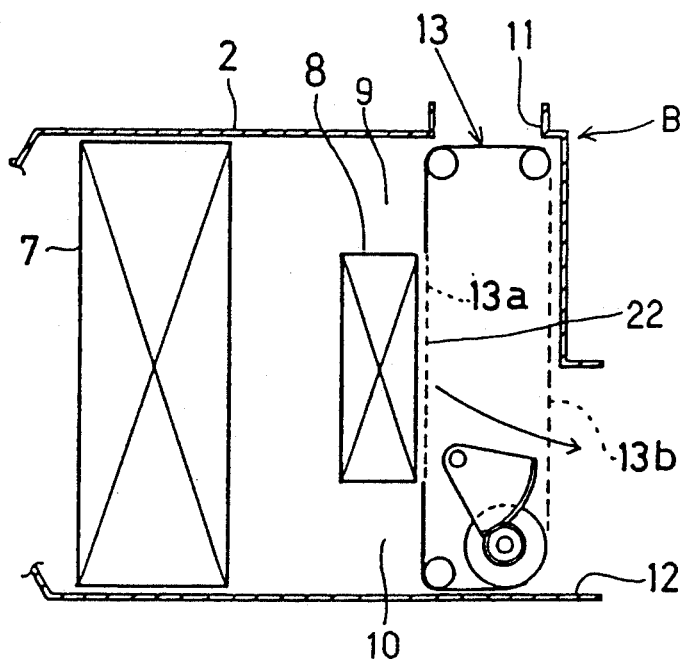
FIG. 4 is a schematic illustration of an air-conditioning section showing a first embodiment in "Max Heat Mode" according to the present invention.

The film damper 13 is moved to the position shown in FIG. 4, that is, the heated air passage 22 is fully opened by the first damper opening 13a. The first and second bypass passages 9 and 10 are fully blocked by the film damper 13. At the same time, the first air outlet 11 is fully blocked by the film damper 13 and the second air outlet 12 is fully opened by the second damper opening 13b. As a result, all of air cooled by evaporator 7 is heated by the heater core 8. The heated air passing through the second air outlet 12 flows into the passenger compartment through the ventilation air outlet and the heated air outlet.

The above-described automotive air-conditioner is capable of controlling the temperature of air flowing into the passenger compartment, adjusting the ratio of cross-sectional area of the first and second air outlets 11 and 12 and opening and closing the first and second air outlets 11 and 12.

Accordingly, compared with a conventional automotive air-conditioner using one film damper for controlling the temperature of air and the other film damper for opening and closing an outlet, the above described automotive air-conditioner is capable of saving space. Further, by using one film damper 13 the number of parts is reduced so that the production costs of the automotive air-conditioner is reduced. Furthermore, in accordance with the reduction of the number of parts, cross-sectional area of passage in the duct 2 can be expanded, which results in the reduction of air-flowing resistance and noise.

Figure 5:
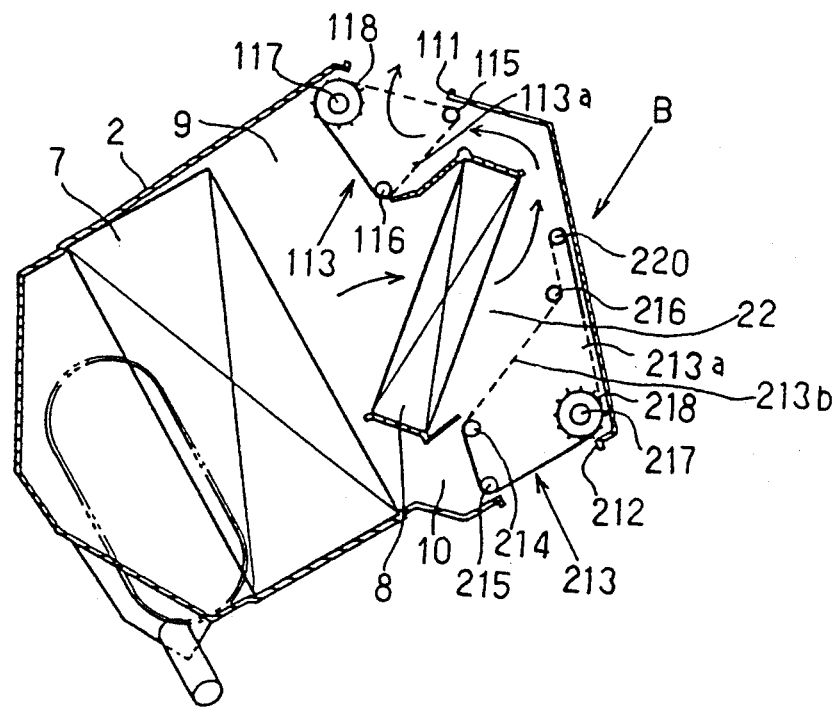
FIG. 5 is a schematic illustration of an air-conditioning section showing a second embodiment in "Defrosting Mode" according to the present invention.

The second embodiment of the invention will be described next by referring to FIGS. 5 through 8. As shown in FIG. 5, the automotive air-conditioner comprises a first film damper 113 disposed close to a outlet 111 connected to the ventilation air outlet and the defrosting air outlet (both not shown) in a passenger compartment. A second film damper 213 is disposed close to a second air outlet 212 connected to the heated air outlet (not shown) for independently controlling the temperature of air flowing into the passenger compartment.

The first and second film dampers 113 and 213 are independently moved by operating a temperature control lever (not shown). The temperature control lever is connected to driving gears 118 and 218 through a driving plate (not shown). The driving gears 118 and 218 are fixed at the both ends of driving shafts 117 and 217 respectively. Rollers 115 and 116 and the driving shaft 117 are rotatably supported at their both ends by the respective corners of a pair of frame members (not shown) so as to form into a triangle shape. As a result, the first film damper 113 which covers the frame made of the rollers 115 and 116 and the driving shaft 117 forms into a triangle shape cross-sectionally also and slides on the frame.

Similarly rollers 214–216 and 220 and the driving shaft 217 are rotatably supported at their both ends by the respective corners of a pair of frame members (not shown) so as to form into a pentagonal shape. As a result, the second film damper 213 which covers the frame made of rollers 214–216 and 220 and the driving shaft 217 forms into a pentagonal shape cross-sectionally also and slides on the frame.

The first film damper 113 has a damper opening 113a. The second film damper 213 has a first damper opening 213a and a second damper opening 213b. The damper opening 113a, 213a and 213b are formed from a plurality of slits and shown as dashed lines in FIGS. 5 through 8.

A first and second bypass passages 9 and 10 are defined between a heater core 8 and an inner wall of the duct 2. The first bypass passage 9 is connected to the first air outlet 111 and the second bypass passage 10 is connected to the second air outlet 212. The temperature control lever can be set in "Defrosting Mode", "Max Cooling Mode", "Bi-Level Mode" and "Max Heat Mode". The first film damper 113 has a damper opening 113a which selectively opens the first air outlet 111 to control the temperature of air flowing through the first air outlet 111 in accordance with the mode set by the temperature control lever. The circumference of the damper opening 113a is about ⅔ the circumference of the film damper 113 itself. The second film damper 213 opens and closes the second air outlet 212 and controls the temperature of the air flowing through the second air outlet 212 in accordance with the mode set by the temperature control lever. The second film damper 213 has a first opening 213a and a second opening 213b in its circumference.

(d) FIG. 5 shows the case when the temperature control level is set in the "Defrosting Mode".

The first bypass passage 9 is blocked by the first film damper 113. A heated air passage 22 and the first air outlet 111 are opened by the damper opening 113a. The second bypass passage 10 and the second air outlet 212 are blocked by the second film damper 213. As a result, the air passing through the evaporator 7 is all heated by passing through the heater core 8 and flows into the passenger compartment through the first air outlet 111.

Figure 6:
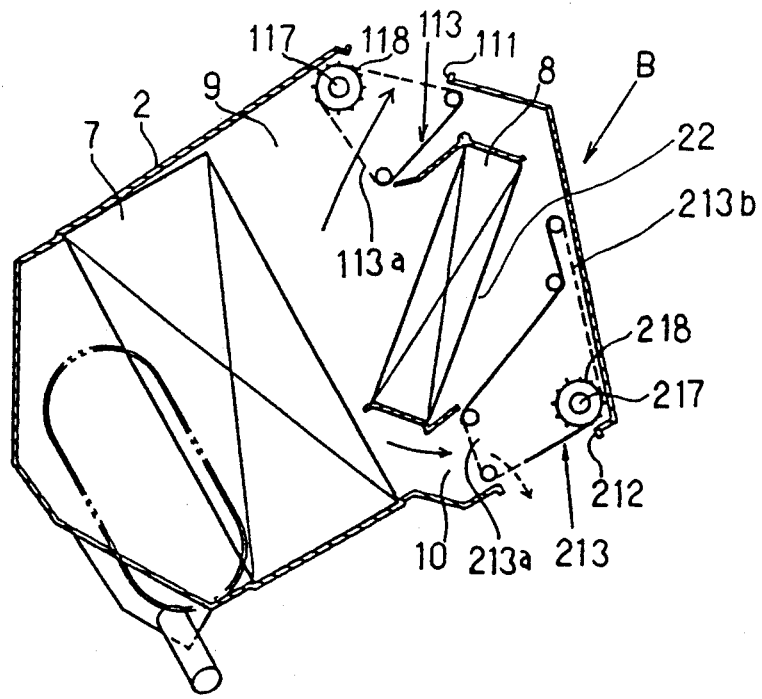
FIG. 6 is a schematic illustration of an air-conditioning section showing a second embodiment in "Max Cooling Mode" according to the present invention.

(e) FIG. 6 shows the case when the temperature control lever is set in the "Max Cooling Mode".

As seen therein, the heated air passage 22 connected to the first air outlet 111 is blocked by the first film damper 113. At the same time, the first bypass passage 9 and the first air outlet 111 are fully opened by the damper opening 113a. The heated air passage 22 connected to the second air outlet 212 is blocked by the second film damper 213. The second bypass passage 10 and a part of the second air outlet 212 are opened by the second damper 213a. As a result, the greater part of air cooled by passing through the evaporator 7 flows into the passenger compartment through the first air outlet 111, and the rest flows into the passenger compartment through the second air outlet 212.

Figure 7:
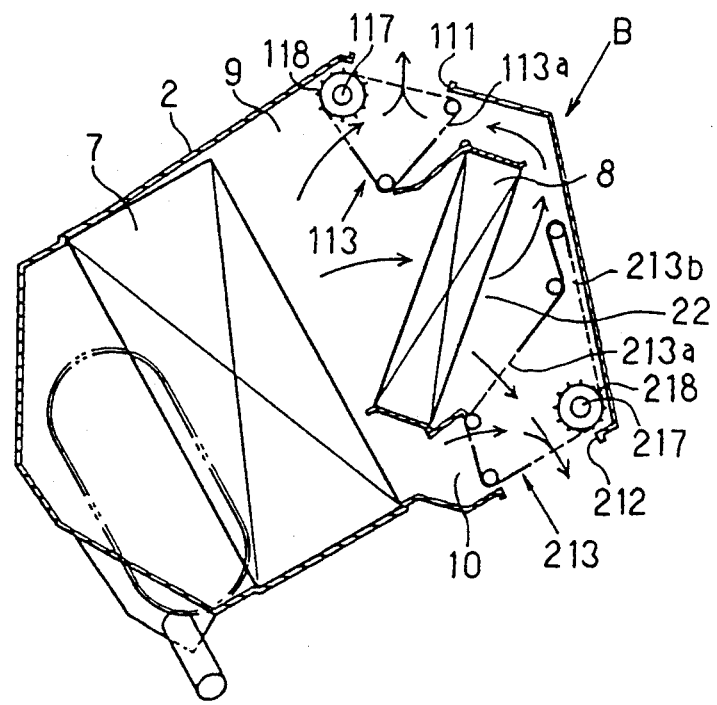
FIG. 7 is a schematic illustration of an air-conditioning section showing a second embodiment in "Bi-Level Mode" according to the present invention.

(f) FIG. 7 shows the case when the temperature control lever is set in the "Bi-Level Mode".

In this mode, the heated air passage 22 connected to the first air outlet 111 and the first bypass passage 9 are partly opened by the damper opening 113a. At the same time the first air outlet 111 is also opened by the damper 113a of the film damper 113.

The second bypass passage 10 and the heated air passage 22 connected to the second air outlet 212 are partly opened by the first damper opening 213a, at the same time, the second air outlet 212 is partly opened by the second damper opening 213b.

As a result, the temperature of air passing through the evaporator 7 is independently controlled by the first and second film dampers 113 and 213 so that the mixed hot and cool air flows into the passenger compartment through both air outlets 111 and 212.

Figure 8:
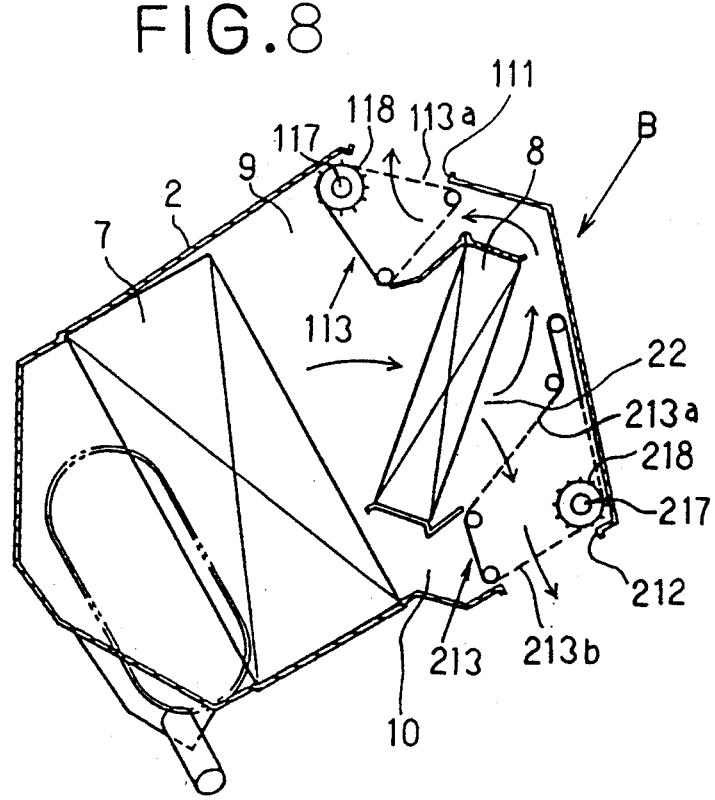
FIG. 8 is a schematic illustration of an air-conditioning section showing a second embodiment in "Max Heat Mode" according to the present inveniton.
Figure 9:
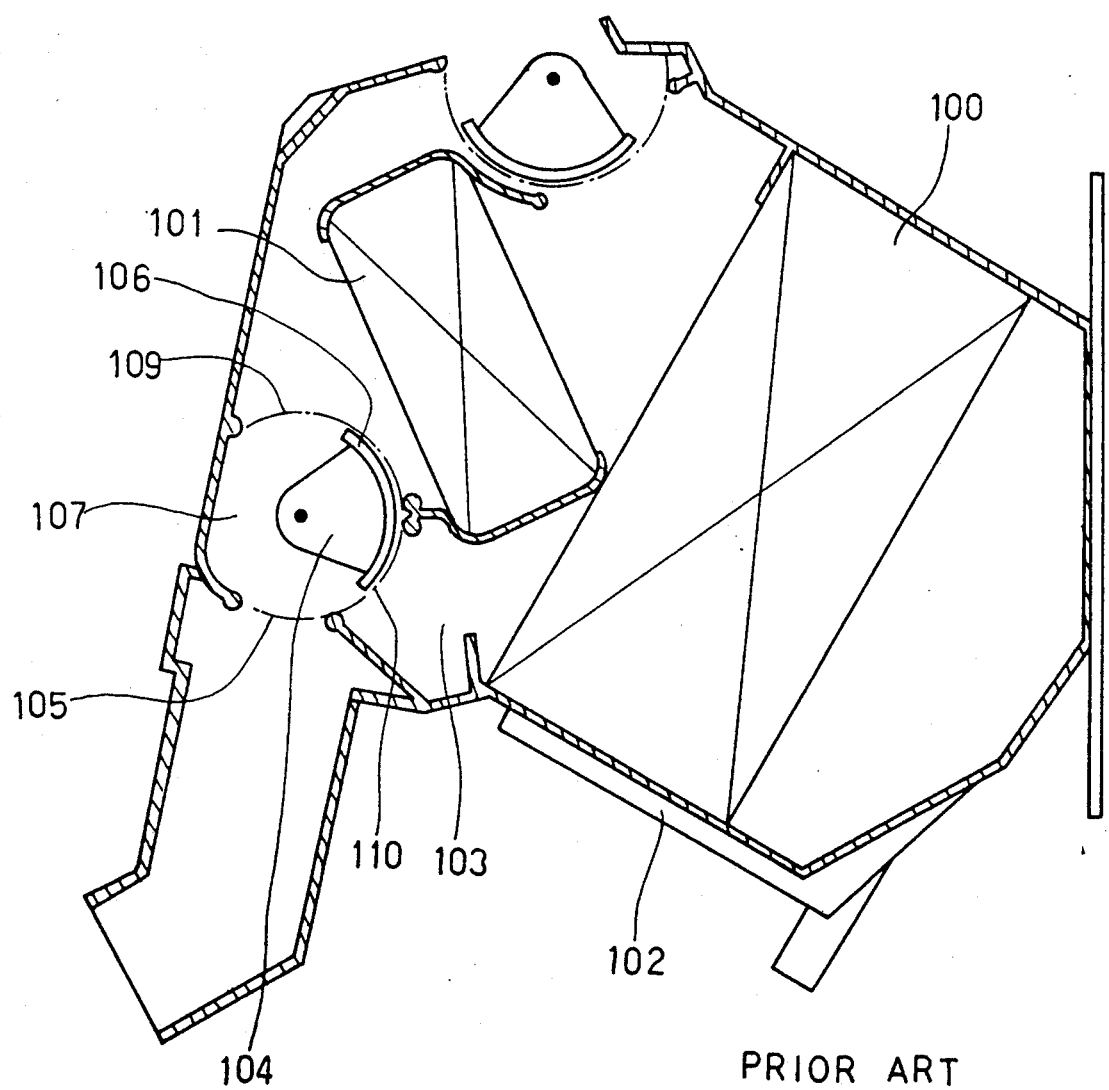
FIG. 9 is a schematic illustration of the prior art air-conditioning section discussed above.

(g) FIG. 8 shows the case when the temperature controlling levers is set the "Max Heat Mode".

As seen therein, the first bypass passage 9 is blocked by the first film damper 113 and the first air outlet 111 is opened by the damper opening 113a of the first film damper 113. The second bypass passage 10 is blocked by the second film damper 213, at the same time, the heated air passage 22 connected to the second air outlet 212 is opened by the first damper opening 213a, and the second air outlet 212 is opened by the second damper opening 213b.

As a result, the air passing through the evaporator 7 is all heated by passing through the heater core 8 so that heated air flows into the passenger compartment through both first and second air outlets 111 and 212.

When independent temperature control is required for the air flowing through the first air outlet 111 and the second air outlet 212, the conventional technology requires film dampers in four positions. However, according to the second embodiment, film dampers are required in just two positions. As a result, the second embodiment has the same advantages as the first embodiment of the invention.

Although only two embodiments of the present invention have been described herein, it should be apparent to those skilled in the air that the present invention may be embodied in many other specific forms without departing from the spirit or scope of the invention. In the described first and second embodiments of the invention, each film damper is formed from an endless film. However, it should be appreciated that each film damper may alternatively be formed such that the film damper is rolled up on scrolls at both ends of the film damper.

In the described embodiment of the invention, the film dampers are supported in a rectangular shape, a triangle shape and a pentagonal shape cross-sectionally respectively by the frames.

However, the film dampers may alternatively be supported in other polygonal shapes cross-sectionally by frames so as to fit the inner space of the duct 2. The film damper openings 13a and 13b are formed by slits, however, each film damper opening may alternatively be formed by holes, square openings or one opening in order that conditioned air may pass through the opening or openings. In the described embodiments of the invention, the heater core 8 is used as heating means. However electric heater, for example, PTC heater, may alternatively be used as heating means. Therefore, the present example and embodiments are to be considered as illustrative and not restrictive and the invention is not to be limited to the details given herein, but may be modified within the scope of the appended claims.

What is claimed is:

1. An automotive air-conditioning comprising:
   a duct for delivering conditioned air into a passenger compartment;
   heating means disposed in said duct for heating air passing therethrough;
   a bypass passage defined between said heating means and an inner wall of said duct for bypassing said heating means so that bypassed air is unheated by said heating means;
   a heated air passage for carrying heated air passing through said heating means, said heated air passage being defined downstream of heating means within said duct;
   at least one air outlet for discharging air from said duct into the passenger compartment;
   damper means made of a flexible film belt having at least one damper opening, movably disposed in said duct downstream of said heating means, including at least one damper element, each said damper element being a single element including means for 1) mixing the air from said bypass passage and said heated air passage and 2) opening and closing at least one of said heated air passage, said bypass passage and said air outlet in accordance with the position thereof; and
   driving means for movably driving said damper means to change the position of said damper opening so that the opening size of said air outlet is adjusted.

2. An air-conditioner according to claim 1, wherein said damper means is formed by a single film belt.

3. An air-conditioner according to claim 2, wherein said at least one air outlet includes a first and second outlets, and said single film belt has a first and second damper openings which are effective to change opening areas of said heated air passage said bypass passage and said first and second air outlets.

4. An air-conditioner according to claim 3, wherein said driving means comprises a plurality of rollers movably supporting said damper means so that said single film belt is supported in a polygonal shape cross-sectionally.

5. An air-conditioner according to claim 1, wherein said damper element is formed by one single film belt.

6. An air-conditioner according to claim 5, wherein said driving means comprises a plurality of rollers movably supporting said damper element so that said film belt is supported in polygonal shape cross-sectionally.

7. An air-conditioner comprising:
   A duct means for forming a heated air passage therewithin, an unheated air passage and a plurality of air outlets opening into a compartment;
   flexible film damper means located in said duct upstream of said air outlets and downstream of said air passages, each said flexible film damper means having two sides and forming an air-mixing space therein between the two sides and also opening and closing the plurality of air outlets;
   supporting means for movably supporting said flexible film damper means in a polygonal shape cross-sectionally; and
   driving means for driving said flexible film damper means so that the temperature of the air mixed in said air mixing space is varied in accordance with the position of said flexible film damper.

8. An air-conditioner according to claim 7, wherein said flexible film damper means is formed by a single film belt.

9. An automotive air-conditioner comprising:
   means for forming an air passage and a plurality of air outlets opening to a compartment;
   heating means disposed upstream of said air outlets for heating the air;
   bypass means for making the air bypass said heating means;
   damper means formed only one endless film belt having at least one opening and disposed upstream of said air outlets and downstream of said heating means in such a manner to cover an area which mixes the air from said heating means and from said bypass means and at which said air outlets are open for controlling the temperature of the air discharged from said air outlets so that said damper means works as an air mixing damper and a damper for changing a plurality of said air outlets; and
   driving means for moving said damper means to a predetermined location.

* * * * *